US012602505B2

(12) United States Patent
Aldrich et al.

(10) Patent No.: US 12,602,505 B2
(45) Date of Patent: Apr. 14, 2026

(54) AUDITING OF DATABASE SEARCH QUERIES FOR PRIVILEGED DATA

(71) Applicant: International Business Machines Corporation, Armonk, NY (US)

(72) Inventors: Craig S. Aldrich, Rochester, MN (US); Mark J. Anderson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 17/304,558

(22) Filed: Jun. 23, 2021

(65) Prior Publication Data

US 2022/0414253 A1      Dec. 29, 2022

(51) Int. Cl.
| | |
|---|---|
| *G06F 21/62* | (2013.01) |
| *G06F 16/22* | (2019.01) |
| *G06F 16/2452* | (2019.01) |
| *G06F 16/2457* | (2019.01) |
| *G06F 16/248* | (2019.01) |

(52) U.S. Cl.
CPC ...... *G06F 21/6227* (2013.01); *G06F 16/2282* (2019.01); *G06F 16/24524* (2019.01); *G06F 16/24573* (2019.01); *G06F 16/248* (2019.01); *G06F 2221/2101* (2013.01)

(58) Field of Classification Search
CPC ............. G06F 21/6227; G06F 16/2282; G06F 16/24524; G06F 16/24573; G06F 16/248; G06F 2221/2101; G06F 16/24542; G06F 21/6218
USPC .......................................................... 726/22
See application file for complete search history.

(56) References Cited

U.S. PATENT DOCUMENTS

| | | | |
|---|---|---|---|
| 5,987,455 A | 11/1999 | Cochrane | |
| 5,999,978 A | 12/1999 | Angal | |
| 6,950,824 B1 * | 9/2005 | Babiskin ............. | G06F 21/6227 707/999.1 |
| 7,127,448 B1 | 10/2006 | Wong | |
| 8,510,329 B2 | 8/2013 | Balkir | |
| 11,216,581 B1 * | 1/2022 | Arikapudi ............... | G06F 21/31 |
| 11,507,685 B1 * | 11/2022 | Carru .................... | G06F 16/248 |
| 2005/0193043 A1 | 9/2005 | Hoover | |
| 2005/0289342 A1 * | 12/2005 | Needham ............ | G06F 21/6227 713/169 |
| 2006/0020581 A1 * | 1/2006 | Dettinger .............. | G06F 21/604 707/999.009 |
| 2007/0136237 A1 * | 6/2007 | Barker ................ | G06F 21/6227 |
| 2007/0136814 A1 | 6/2007 | Lee | |
| 2007/0192478 A1 | 8/2007 | Louie | |
| 2013/0046774 A1 * | 2/2013 | Fish .................... | G06F 21/6227 707/754 |
| 2016/0267293 A1 * | 9/2016 | Subbiah ............ | G06F 16/24534 |
| 2016/0314157 A1 * | 10/2016 | Xiao ................... | G06F 16/2282 |

(Continued)

FOREIGN PATENT DOCUMENTS

EP            1850245 A1     10/2007

*Primary Examiner* — Catherine Thiaw
*Assistant Examiner* — Nega Woldemariam
(74) *Attorney, Agent, or Firm* — Patterson + Sheridan, LLP

(57) ABSTRACT

An approach for identifying privileged access to a database is provided. A processor receives a query plan to search the database. A processor determines the query plan includes a request that accesses privileged data. A processor generates an updated query plan with an indication of the request that accesses privileged data. A processor sends the updated query plan for an audit of the query plan.

18 Claims, 4 Drawing Sheets

(56) References Cited

U.S. PATENT DOCUMENTS

| | | | |
|---|---|---|---|
| 2018/0012031 A1* | 1/2018 | Block | G06F 21/6218 |
| 2018/0060603 A1* | 3/2018 | Ahmed | G06F 16/2379 |
| 2019/0026339 A1* | 1/2019 | Bastawala | G06F 16/221 |
| 2019/0102553 A1* | 4/2019 | Herwadkar | G06N 20/00 |
| 2021/0056100 A1* | 2/2021 | Steinhauser | G06F 16/248 |
| 2022/0269683 A1* | 8/2022 | Hasegawa | G06F 16/9535 |

* cited by examiner

AUDITING OF DATABASE SEARCH QUERIES FOR PRIVILEGED DATA

BACKGROUND OF THE INVENTION

The present invention relates generally to the field of database management, and more particularly to auditing of search queries.

Databases are sets of related data that include records. For example, a database may have a record for each employee of an organization. For each record, various data values are stored for the particular record. For example, a record will have the first and last name of an employee. Databases permit users to quickly search for certain data values within the records for a variety of purposes, such as employees with a certain start date of employment.

Privileged data is any record or value in the database that may need to be protected due to, or otherwise controlled from, being accessed. For example, an employee's home address or wage history may be identified as protected content in the database. In some scenarios or for certain users, the privileged content may need to be accessed by users. For example, a paycheck needs to be sent to a group of employees, requiring access to the protected address value of various records. Auditing, in the database domain, is the process of identifying and analyzing user actions to provide record of who may have accessed privileged data stored in the database.

SUMMARY

Embodiments of the present invention provide for a computer implemented method, computer program product and computer system to identify privileged access to a database. A processor receives a query plan to search the database. A processor determines the query plan includes a request that accesses privileged data. A processor generates an updated query plan with an indication of the request that accesses privileged data. A processor sends the updated query plan for an audit of the query plan.

DETAILED DESCRIPTION

Figure 1:
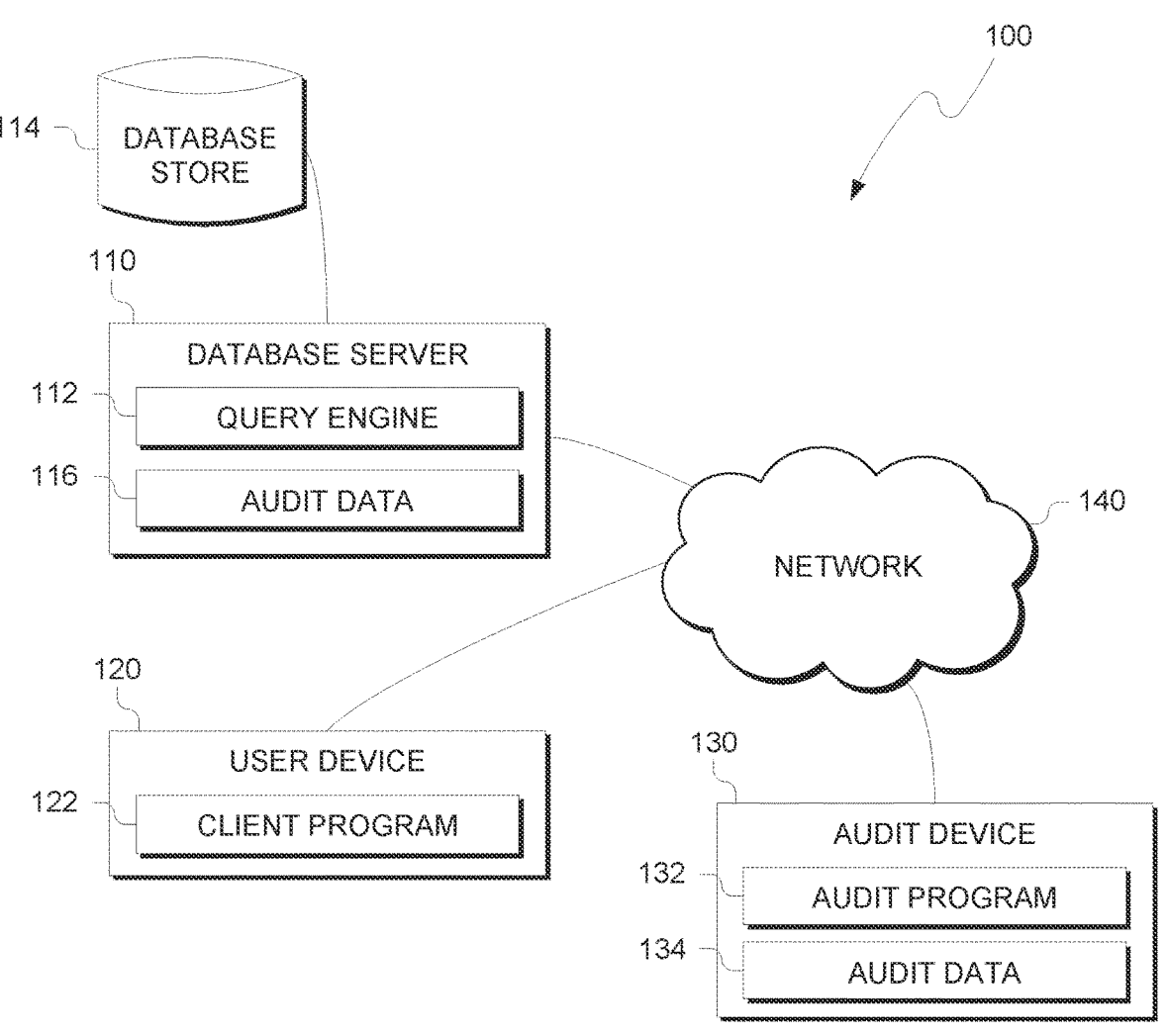
FIG. 1 is a functional block diagram illustrating a networked environment, in accordance with an example embodiment of the present invention.

While solutions to database search auditing are known, prior solutions only detect when a table with privileged data is accessed by a query. However, a search query by a user may not access columns, or values of the records, which contain privileged data. In those scenarios, an auditing program must still process and analyze the queries that access the table, resulting in many "false positives" that in actuality never access the privileged data. Embodiments of the present invention provide for improvements to database auditing that eliminate such scenarios from being audited, permitting auditors to focus only on queries that actually access privileged data. By inserting indicators directly into recorded databased queries that access privileged data values or columns, embodiments of the present invention improve upon prior database auditing methods by providing a mechanism to specifically identify and determine search queries that access data values of records in the database that store privileged data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the FIGS. FIG. 1 is a functional block diagram illustrating networked environment, generally designated 100, in accordance with one embodiment of the present invention. Networked environment 100 includes database server 110, database store 114, user device 120, and audit device 130 connected over network 140. Database server 110 includes query engine 112 and audit data 116. User device includes client program 122. Audit device 130 includes audit program 132 and audit data 134.

In various embodiments of the present invention, database server 110, database store 114, user device 120, and audit device 130 are computing devices that can be a standalone device, a server, a laptop computer, a tablet computer, a netbook computer, a personal computer (PC), or a desktop computer. In another embodiment, database server 110, database store 114, user device 120, or audit device 130, either individually or collectively, represent a computing system utilizing clustered computers and components to act as a single pool of seamless resources. In general, database server 110, database store 114, user device 120, and audit device 130 can be any computing device or a combination of devices with access to audit data 116 and audit data 134 and is capable of executing query engine 112, client program 122 and audit program 132. Database server 110, database store 114, user device 120, and audit device 130 may include internal and external hardware components, as depicted and described in further detail with respect to FIG. 4.

In this exemplary embodiment, query engine 112 and audit data 116 are stored on database server 110; client program 122 is stored on user device 120; and audit program 132 and audit data 134 are stored on audit device 130. However, in other embodiments, query engine 112, audit data 116, client program 122, audit program 132 and audit data 134 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between database server 110, database store 114, user device 120, and audit device 130, in accordance with a desired embodiment of the present invention.

In various embodiments, query engine 112 receives search queries from client program 122 of user device 120. Client program 122 provides various features and functions that provide for users being able to search for records stored in database store 114. While the following is discussed in regards to a single user device 120 and corresponding client program 122 for clarity, one of ordinary skill will understand that various embodiments of the invention provide for multiple users with a respective user device 120 and corresponding client program 122 that provides the functionality for each user to submit search queries to query engine 112 of database server 110. In various embodiments, query engine 112 parses the incoming searches from client program 122 and provides the results of matching records stored in database store 114.

In various embodiments, database store 114 is a relational database comprising various tables of data. Each table is comprised of rows and columns, with each row corresponding to a record or instance of various data values—with the various data values of the record corresponding to columns in the table. For example, a payroll database would have records or rows for each employee on the payroll and the columns would be the specific values tracked by the database for each employee, such as wages and compensation, mailing address and the like. Relational databases include a variety of tables with different rows and columns that are linked, or related, to other rows via a unique key of ID number. Such an arrangement permits a user, via client program 122, to search for rows and columns that match a query but are maintained in two or more separate tables. For example, database store 114 is maintained as a Structured Query Language (SQL) relational database. In some embodiments, database store 114 is a non-relational database such as Not Only SQL (NoSQL). As will be clear to one of ordinary skill in the art based on the following, embodiments of the present invention can be deployed to any type of structure or schema for database store 114.

In various embodiments, query engine 112 receives a search query from client program 122 of user device 120. For example, the search query may be a SQL statement which includes various functions and operations to search for rows or records that match the constraints of the search query. In SQL, this type of search query is referred to as a query plan or execution plan. For example, an SQL query plan for searching for customers with a certain zip code could be performed by the following:

```
SELECT*FROM [Dimension].[Customer]
WHERE [ZIP Code] = '90210'
ORDER BY [Customer]
GO
```

In the above example, query engine 112 searches the various tables and records stored in database store 114 to find the rows (i.e., customer records) that have a "Zip Code" column that equals '90210'.

In various embodiments, query engine 112 evaluates incoming query plans to determine if the query will access or otherwise provide the user with results that contained privileged data. While the above is a simple example, most query plans include a large variety of operations, such as views, functions, conditional operators and the like that may access or otherwise provide client program 122 with results that include privileged data. In such cases when a query plan would result in returning records or values that have been marked as privileged data, query engine 112 updates the query plan with one or more indicators, which permits audit program 132 to quickly identify query plans that accessed privileged data.

In various embodiments, database store 114 includes or otherwise indicates which rows and columns of the various tables of data have privileged data. Privileged data is any data that a maintainer or operator of database server 110 deems to be sensitive, private, confidential or otherwise should be limited in access to users submitting queries. Privileged data may be any column or value of the stored records that should be monitored and audited for proper usage of the privileged data. For example, a home address column may be marked as privileged for employee records, but a first name field would not be marked as privileged. In some scenarios, privileged data may indicate certain records that may be privileged for which access should be monitored and audited.

In various embodiments, query engine 112 evaluates incoming query plans to determine if the query will access or otherwise provide the user with results that contain privileged data. In some scenarios, query engine 112 determines that a query plan generates results with privileged data based on the contents of the query plan. For example, query engine 112 identifies all columns that will be accessed in a query which include privileged data values, as provided by the operators of database server 120. In such scenarios where a received query plan includes values or columns that are marked as privileged, query engine 112 updates the query plan with an indicator or other indicative information that marks the query plan for audit.

For example, query engine 112 receives various SQL query plans to search database store 114. SQL query plans typically start with one or more SELECT statements which select which data values will be columns in a result table, or result-set. If the SELECT statement includes values or fields that have been indicated as being privileged, then query engine 112 updates the query plan with an indicator such that audit program 132 can quickly identify queries that accessed privileged fields or values in database store 114. In some scenarios, query engine 112 appends metadata to the query plan in a header portion of the query plan. In other scenarios, query engine 112 adds comments to the query plan to indicate that the query plan accessed privileged data. In some scenarios, query engine 112 adds an indicator to the beginning or end of the search plan. In other scenarios, query engine 112 adds a comment inline or within the query plan. Query engine 112 identifies the operations in the query plan that will cause access to privileged data then insets comments inline with the query plan to highlight the portions of the query plan that cause the privileged access. Additionally, in various scenarios and embodiments, query engine 112 may include other information related to the query plan, such as the user who requested the search, time accessed, session time and the like to be utilized during the auditing process.

In some embodiments, query engine 112 analyzes the result table instead of the query plan. For example, query engine 112 identifies if any provided records or values in the result table generated by the query plan provides privileged data to the user. In such embodiments, query engine 112 updates the query plan with a comment or the header with metadata indicating the privileged access occurred.

In various embodiments, query engine 112 provides the results of each query plan to the respective user. In some scenarios, query engine 112 reviews the provided search results to identify if any results contain privileged data. For example, certain records may be marked as privileged (e.g., records for executives and employees of a company). For search queries that return such records, query engine 112 marks the search plan for audit.

In various embodiments, audit program 132 provides tools and features for users to review or audit various query plans that have been updated with privileged access indicators by query engine 112. Audit program 132 retrieves audit data 116, which include query plans that accessed, viewed, or otherwise relied upon privileged data stored in database store 114. By marking the query plans which included queries that access privileged data, query engine 112 enables operation of audit program 132 to be improved; audit program 132 utilizes the indicators to quickly identify portions of the query plan that caused the privileged access. In some embodiments, query engine 112 sends marked query plans to audit program 132 as the queries are received. In turn, audit program 132 stores the query plans in audit data 134 for later use. In some scenarios, audit program 132 notifies a user of incoming query plans saved to audit data 134 that caused the privileged access for review. In various embodiments, audit program 132 provides the query plan, along with any other metadata, to the user to permit the user to review or audit the query for any potential misuse.

Figure 2:
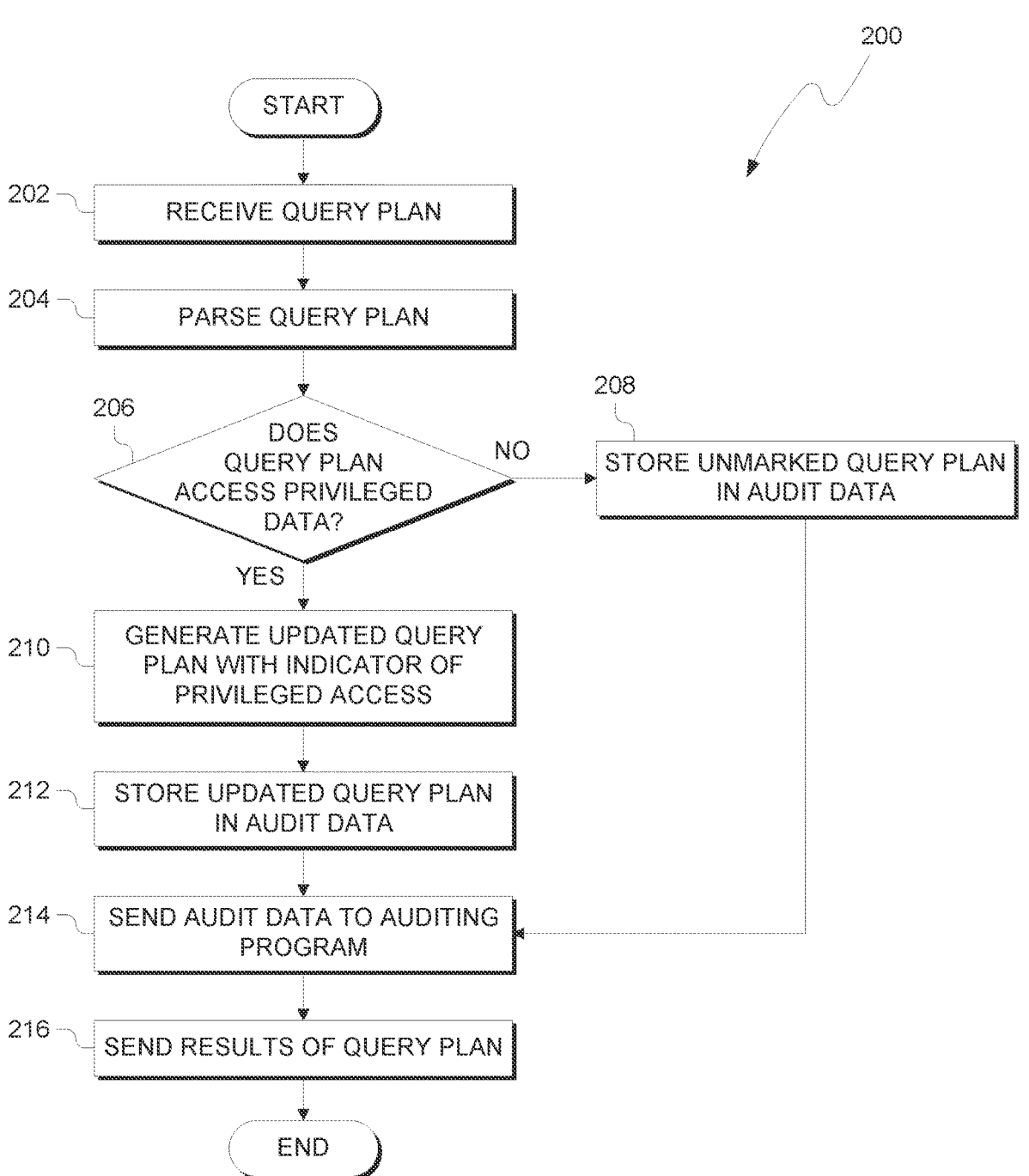
FIG. 2 illustrates operational processes of a query engine, on a computing device within the environment of FIG. 1, in accordance with an example embodiment of the present invention.

FIG. 2 illustrates operational processes, generally designated 200, of query engine 112. In process 202, query engine 112 receives a query plan from client program 122. Client program 122 receives input from a user to create the query plan, which instructs query engine 112 on how to search various records stored in database store 114. In various embodiments, the query plan is a series of operations, functions and variables to be parsed by query engine 112. For example, query plan may be written in SQL.

In process 204, query engine 112 parses the received query plan from client program 122. Based on the operations, functions and variables contained, query engine 112 parses the query to determine the operations necessary to perform the received query plan. In decision process 206, query engine 112 determines if the query plan accesses privileged data. For example, query plan may include variable referencing columns or values in database store 114 that have been indicated as being privileged by an operator of database server 110. If query engine 112 determines that query plan does not access privileged data (NO branch of decision process 206), then query engine 112 stores the query plan without and indicators or markups in audit data 116 (process 208). Then query engine 112 sends the query plan to audit program 132 for record keeping of searches performed. While not needed for auditing of privileged data access, queries may still need to be maintained and recorded for compliance or other purposes. Then, query program 112 sends the results table to client program 122 to display the results to the requesting user.

If query engine 112 determines that the received query plan does access privileged data (YES branch of decision process 206), then query engine 112 generates an updated query plan with one or more indicators that designate the query plan will access, provide a view of results to the user of client program 122 that include privileged data (process 210). In some scenarios, query engine 112 appends metadata to the query plan in a header portion of the query plan. In other scenarios, query engine 112 adds comments to the query plan to indicate that the query plan accessed privileged data. Additionally, in various scenarios, query engine 112 may include other information related to the query plan, such as the user who requested the search, time accessed, session time and the like to be utilized during the auditing process.

In process 212, query engine 112 stores the updated query plan in audit data 116 with the comments, metadata or any other type of indicator that designates that the query plan will provide access to privileged data to the user. In process 214, query engine 112 sends audit data 116 to auditing program 132 for filtering and reporting, which is discussed herein regarding FIG. 3. In some scenarios and embodiments, query engine 112 sends notices of privileged accesses as they occur to audit program 132. In other scenarios, process 214 may be performed in batches or at set intervals or times. In process 216, query engine 112 sends the results to the user. Based on the parsing of the query plan, query engine 112 generates a table of results for the user of client program 122 to review and perform the intended analysis that prompted the user to send the query plan to query engine 112.

Figure 3:
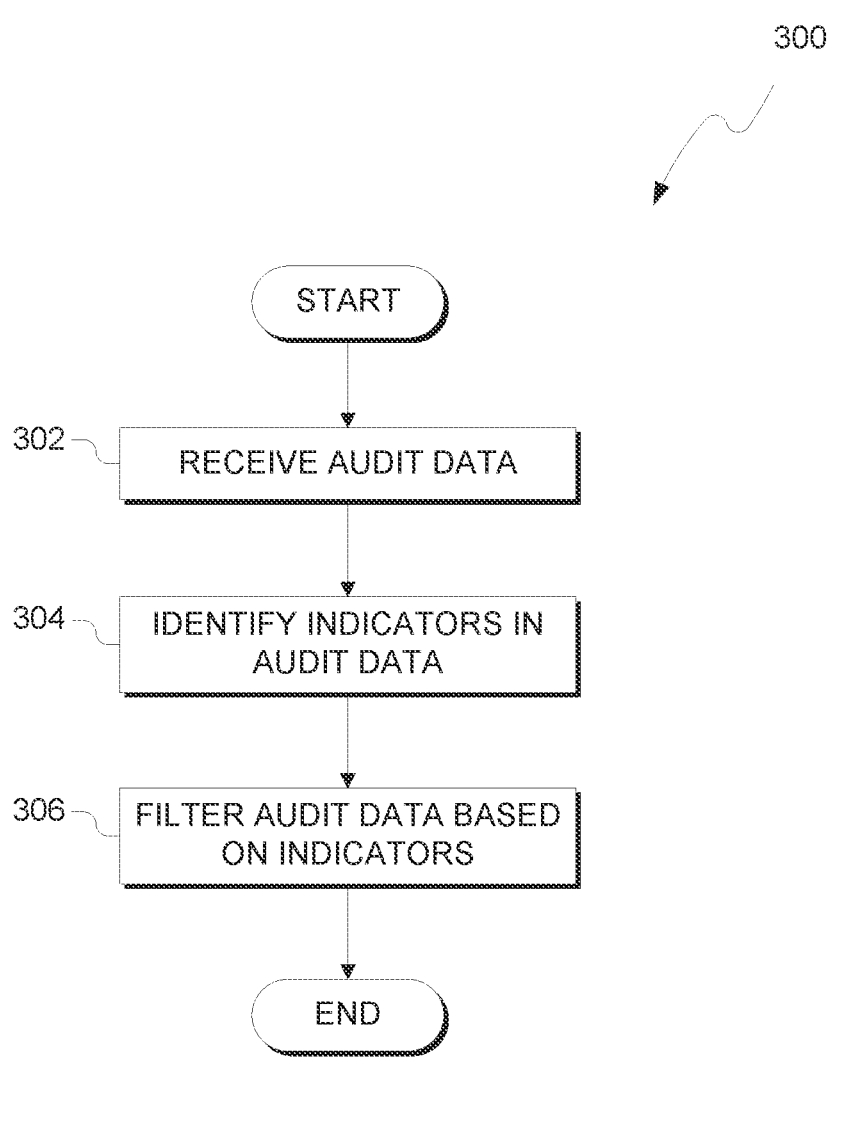
FIG. 3 illustrates operational processes of an audit program, on a computing device within the environment of FIG. 1, in accordance with an example embodiment of the present invention.

FIG. 3 illustrates operational processes, generally designated 300, of audit program 132. In process 302, audit program 132 receives audit data 116 from query engine 112, storing the query plans in audit data 134. In some scenarios and embodiments, audit program 132 receives audit data 116 as query plans are parsed and performed by query engine 112. In other scenarios and embodiments, audit program 132 receives audit data 116 in batches which contain more than one query plan. In such scenarios, audit program 132 performs processes 304 and 306 for each query plan in the received audit data 116.

In process 304, audit program 132 identifies any privileged-access indicators present in audit data 134. As discussed herein query engine 112 updates any query plan that caused access to or otherwise provided results that included privileged-access data. Based on the type of indicators (e.g., metadata in header, markup or comments added to the query plan, etc.) inserted by query engine 112, audit program 132 analyzes each query plan in audit data 116 to determine if a query plan did access privileged data. When audit program 132 identifies an indicator was added, audit program 132 filters audit data 134 such that query plans that did access privileged data are sorted or sortable by a user to quickly find and review query plans that accessed privileged data.

Figure 4:
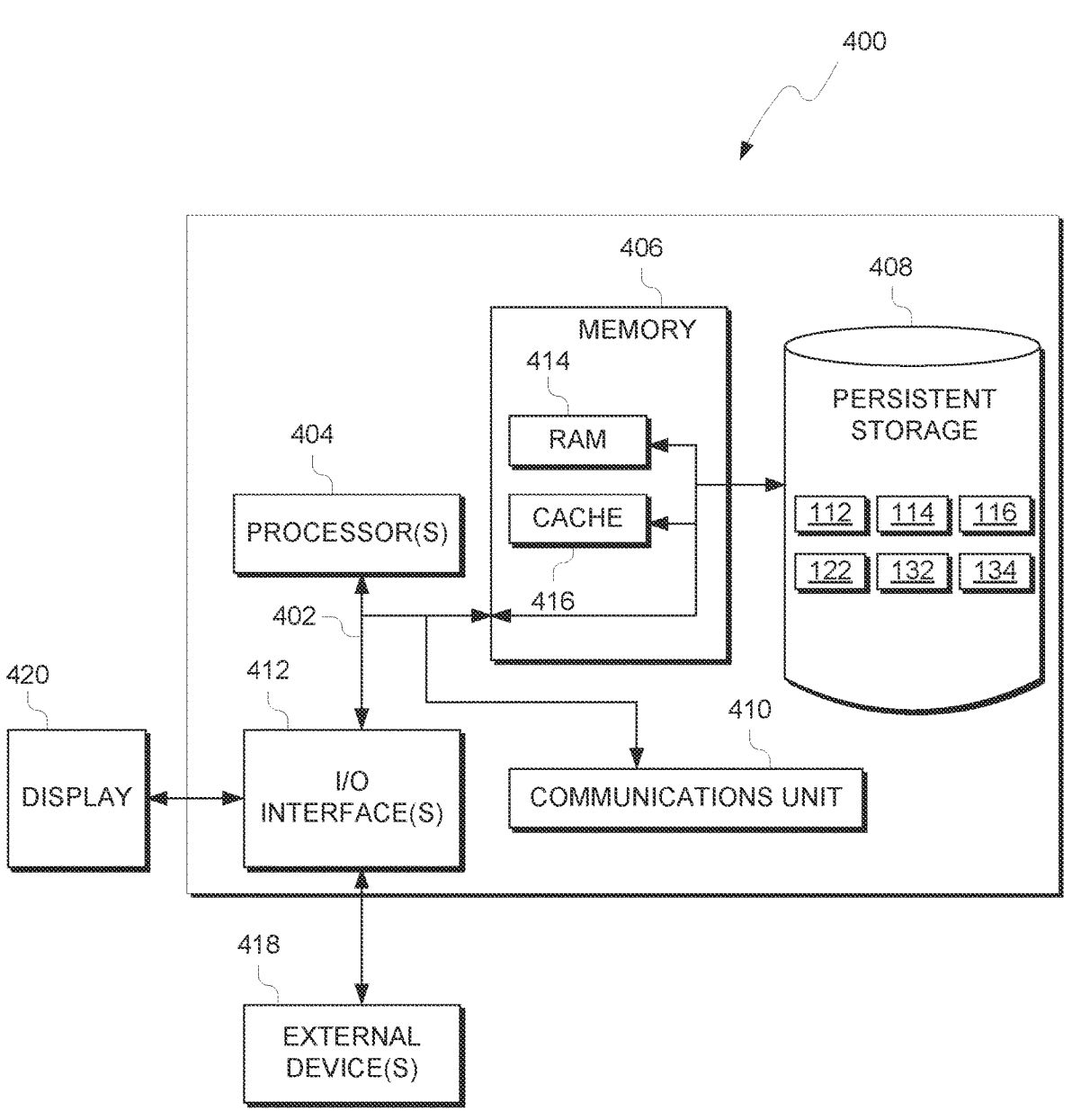
FIG. 4 depicts a block diagram of components of the computing device executing a query program and an audit program, in accordance with an example embodiment of the present invention.

FIG. 4 depicts a block diagram of components for a computing device 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Query engine 112, audit data 116, client program 122, audit program 132 and audit data 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 140. In these examples, communications unit 410 includes one or more network interface cards. Communications unit 410 may provide communications through the use of either or both physical and wireless communications links. Query engine 112, audit data 116, client program 122, audit program 132 and audit data 134 may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., query engine 112, audit data 116, client program 122, audit program 132 and audit data 134, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for identifying privileged access to a database, the method comprising:
receiving, by one or more processors, a query plan from a query request user to search the database;
determining, by the one or more processors, the query plan includes a request that accessed privileged data in the database, wherein the database indicates for the request, which rows and columns of one or more tables of data have the privileged data;
in response to determining the query plan includes the request that accessed privileged data generating, by the one or more processors, an updated query plan that includes both: (i) the request that accessed privileged data, and (ii) an indication of the request that accessed privileged data, wherein the indication indicates one or more operations of the query plan that accessed the privileged data, the query request user and an access time of the query plan; and
sending, by the one or more processors, the updated query plan for an audit of the query plan, wherein the audit enables analysis of the query plan that accessed privilege data by an audit program.

2. The computer-implemented method of claim 1, wherein the indication of the request that accessed privileged data includes metadata related to the query plan.

3. The computer-implemented method of claim 1, wherein the indication of the request that accessed privileged data is stored in a header portion of the updated query plan.

4. The computer-implemented method of claim 1, wherein the indication of the request that accessed privileged data is stored inline with the one or more operations of the query plan that accessed the privileged data.

5. The computer-implemented method of claim 1, wherein determining the query plan further comprises:
determining, by the one or more processors, an operation of the query plan that accessed a column of a table which is indicated as privileged.

6. The computer-implemented method of claim 1, wherein determining the query plan further comprises:
determining, by the one or more processors, the query plan generates a results table that includes a record that is indicated as privileged.

7. A computer program product for identifying privileged access to a database, the computer program product comprising:
one or more computer-readable storage media and program instructions stored on the one or more computer-readable storage media, the program instructions comprising:
program instructions to receive a query plan from a query request user to search the database; program instructions to determine the query plan includes a request that accessed privileged data in the database, wherein the database indicates for the request, which rows and columns of one or more tables of data have the privileged data; program instructions to generate, in response determining the query plan includes the request that accessed privileged data an updated query plan that includes both: (i) the request that accessed privileged data, and (ii) an indication of the request that accessed privileged data, wherein the indication indicates one or more operations of the query plan that accessed the privileged data, the query request user and an access time of the query plan; and
program instructions to send the updated query plan for an audit of the query plan, wherein the audit enables analysis of the query plan that accessed privilege data by an audit program.

8. The computer program product of claim 7, wherein the indication of the request that accessed privileged data includes metadata related to the query plan.

9. The computer program product of claim 7, wherein the indication of the request that accessed privileged data is stored in a header portion of the updated query plan.

10. The computer program product of claim 7, wherein the indication of the request that accessed privileged data is stored inline with the one or more operations of the query plan that accessed the privileged data in the updated query plan.

11. The computer program product of claim 7, wherein program instructions to determine the query plan further comprises:
program instructions to determine an operation of the query plan that accessed a column of a table which is indicated as privileged.

12. The computer program product of claim 7, wherein program instructions to determine the query plan further comprises:

program instructions to determine the query plan generates a results table that includes a record that is indicated as privileged.

13. A computer system for identifying privileged access to a database, the computer system comprising:

one or more processors;

one or more computer readable storage media; and program instructions stored on the computer readable storage media for execution by at least one of the one or more processors, the program instructions comprising:

program instructions to receive a query plan from a query request user to search the database;

program instructions to determine the query plan includes a request that accessed privileged data in the database, wherein the database indicates for the request, which rows and columns of one or more tables of data have the privileged data;

program instructions to generate, in response to the request that accessed privileged data an updated query plan that includes both: (i) the request that accessed privileged data, and (ii) an indication of the request that accessed privileged data, wherein the indication indicates one or more operations of the query plan that accessed the privileged data, the query request user and an access time of the query plan; and program instructions to send the updated query plan for an audit of the query plan, wherein the audit enables analysis of the query plan that accessed privilege data by an audit program.

14. The computer system of claim 13, wherein the indication of the request that accessed privileged data includes metadata related to the query plan.

15. The computer system of claim 13, wherein the indication of the request that accessed privileged data is stored in a header portion of the updated query plan.

16. The computer system of claim 13, wherein the indication of the request that accessed privileged data is stored inline with the one or more operations of the query plan that accessed the privileged data in the updated query plan.

17. The computer system of claim 13, wherein the program instructions to determine the query plan further comprises:

program instructions to determine an operation of the query plan that accessed a column of a table which is indicated as privileged.

18. The computer system of claim 13, wherein the program instructions to receive the query plan permits the query plan to access privileged data.

* * * * *